(12) United States Patent
Yokoo

(10) Patent No.: US 9,628,249 B2
(45) Date of Patent: Apr. 18, 2017

(54) RADIO COMMUNICATION DEVICE, METHOD FOR CONTROLLING RADIO COMMUNICATION, AND RADIO COMMUNICATION SYSTEM

(71) Applicant: FUJITSU LIMITED, Kawasaki-shi, Kanagawa (JP)

(72) Inventor: Kaoru Yokoo, Yokosuka (JP)

(73) Assignee: FUJITSU LIMITED, Kawasaki (JP)

( * ) Notice: Subject to any disclaimer, the term of this patent is extended or adjusted under 35 U.S.C. 154(b) by 96 days.

(21) Appl. No.: 14/056,598

(22) Filed: Oct. 17, 2013

(65) Prior Publication Data

US 2014/0112315 A1    Apr. 24, 2014

(30) Foreign Application Priority Data

Oct. 23, 2012  (JP) .................................. 2012-234095

(51) Int. Cl.
*H04W 72/04*    (2009.01)
*H04W 74/02*    (2009.01)
*H04L 5/00*    (2006.01)
*H04W 72/12*    (2009.01)

(52) U.S. Cl.
CPC ....... *H04L 5/0094* (2013.01); *H04W 72/1242* (2013.01); *H04W 74/02* (2013.01)

(58) Field of Classification Search
None
See application file for complete search history.

(56) References Cited

U.S. PATENT DOCUMENTS

| | | | |
|---|---|---|---|
| 2009/0190566 A1* | 7/2009 | Kwon | H04W 74/02 370/345 |
| 2010/0034159 A1* | 2/2010 | Shin et al. | 370/329 |
| 2010/0329221 A1 | 12/2010 | Nakano | |

(Continued)

FOREIGN PATENT DOCUMENTS

| | | |
|---|---|---|
| EP | 2 226 002 A1 | 9/2010 |
| EP | 2 227 045 A1 | 9/2010 |

(Continued)

OTHER PUBLICATIONS

European Search Report, dated Nov. 10, 2014, issued in European Patent Application No. 13187716.9.

(Continued)

*Primary Examiner* — Kevin C Harper
*Assistant Examiner* — Derrick V Rose
(74) *Attorney, Agent, or Firm* — Arent Fox LLP

(57) ABSTRACT

A radio communication device includes: a receiver configured to receive a radio signal; and a processor coupled to the receiver, configured to switch between a first communication mode and a second communication mode in accordance with scheduling of allocation of a time slot to another radio communication device based on the radio signal, communication between the radio communication device and the another radio communication device being executed using time division multiplexing in the first communication mode, and communication between the radio communication device and the another radio communication device being executed using a competitive access method in the second communication mode.

14 Claims, 14 Drawing Sheets

(56) References Cited

U.S. PATENT DOCUMENTS

| | | | |
|---|---|---|---|
| 2011/0051695 A1* | 3/2011 | Dinan | H04W 72/1242 370/336 |
| 2012/0063397 A1 | 3/2012 | Abedi et al. | |
| 2012/0082036 A1 | 4/2012 | Abedi et al. | |
| 2012/0106397 A1* | 5/2012 | Abedi | H04W 74/0875 370/255 |

FOREIGN PATENT DOCUMENTS

| | | |
|---|---|---|
| EP | 2 227 046 A1 | 9/2010 |
| JP | 2010-500845 A | 1/2010 |
| JP | 2012-519440 A | 8/2012 |
| JP | 2012-519994 A | 8/2012 |
| KR | 2011-087295 A | 4/2011 |

OTHER PUBLICATIONS

IEEE Standard for Local and Metropolitan Area Networks—Part 15.6: Wireless Body Area Network, IEEE Std 802.15.6-2012, Feb. 29, 2012.

Office Action of Japanese Patent Application No. 2012-234095 dated Apr. 19, 2016.

Japanese Office Action of related Japanese Patent Application No. 2012-234095 dated Jun. 28, 2016 (with partial translation).

\* cited by examiner

FIG. 6

| PLCP PREAMBLE | PLCP HEADER | MAC HEADER | MAC FRAME BODY | FCS |

FIG. 11

| FRAME TYPE VALUE b5 b4 | FRAME TYPE NAME | FRAME SUBTYPE VALUE b3 b2 b1 b0 | FRAME SUBTYPE NAME |
|---|---|---|---|
| 10 | DATA | 0111 | EMERGENCY |

RADIO COMMUNICATION DEVICE, METHOD FOR CONTROLLING RADIO COMMUNICATION, AND RADIO COMMUNICATION SYSTEM

CROSS-REFERENCE TO RELATED APPLICATION

This application is based upon and claims the benefit of priority of the prior Japanese Patent Application No. 2012-234095, filed on Oct. 23, 2012, the entire contents of which are incorporated herein by reference.

FIELD

The embodiment discussed herein is related to a radio communication device, method for controlling radio communication, and a radio communication system.

BACKGROUND

Body area networks (BANs) are known (refer to, for example, IEEE802.15.6). The BANs are very short distance radio communication networks for medical care and health care.

For a BAN, a sensor (hereinafter referred to as "node") is downsized. In addition, for the BAN, a gateway device (hereinafter referred to as "hub") is downsized and a battery is used for driving. It is, therefore, preferable to save power for the overall network. If data that is detected by the node indicates urgency, the data is reliably transmitted with a short delay time.

A technique for allocating a slot for urgent data to a superframe and providing slot allocation information for the urgent data to a node is known (refer to, for example, Japanese Laid-open Patent Publication No. 2011-87295).

SUMMARY

According to an aspect of the invention, a radio communication device includes: a receiver configured to receive a radio signal; and a processor coupled to the receiver, configured to switch between a first communication mode and a second communication mode in accordance with scheduling of allocation of a time slot to another radio communication device based on the radio signal, communication between the radio communication device and the another radio communication device being executed using time division multiplexing in the first communication mode, and communication between the radio communication device and the another radio communication device being executed using a competitive access method in the second communication mode.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 6 is a diagram illustrating an example of a beacon frame according to the embodiment;

FIG. 11 is a diagram illustrating an example of setting of an urgent state;

DESCRIPTION OF EMBODIMENT

Figure 1:
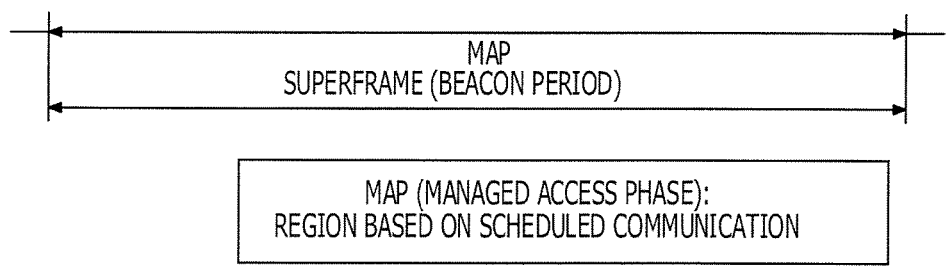
FIG. 1 is a diagram illustrating an example of a superframe for a non-beacon mode with superframes.

Hereinafter, the embodiment is described with reference to the accompanying drawings.

In all the drawings describing the embodiment, parts that have the same functions are indicated by the same reference numerals, and repetitive descriptions are omitted.

While inventing the present embodiments, observations were made regarding a related art. Such observations include the following, for example.

In the radio communication networks of the related art, in order to save energy for an overall network, it is effective to execute schedule-based communication and change the states of a hub and node to sleep states.

FIG. 1 illustrates an example of a superframe for a non-beacon mode (hereinafter merely referred to as "non-beacon mode") with superframes. In FIG. 1, the abscissa indicates time. The non-beacon mode is a mode in which the schedule-based communication is executed. A superframe for the non-beacon mode includes a managed access phase (MAP). The MAP is a time period based on scheduled communication. In the MAP, the scheduled communication is executed using time division multiplexing. In the non-beacon mode, a node other than a node that executes scheduled communication may be in the sleep state, a hub may be in the sleep state for a time period in which the hub does not communicate with a node that has executed scheduling, and whereby power to be consumed may be reduced. When data is unexpectedly generated in a node other than scheduled nodes, the node in which the data is generated may not communicate with the hub and it is difficult to achieve immediate support.

In order to achieve immediate support upon urgency, it is effective to enable the hub to frequently receive data and wait to receive urgent data from a node on a priority basis.

Figure 2:
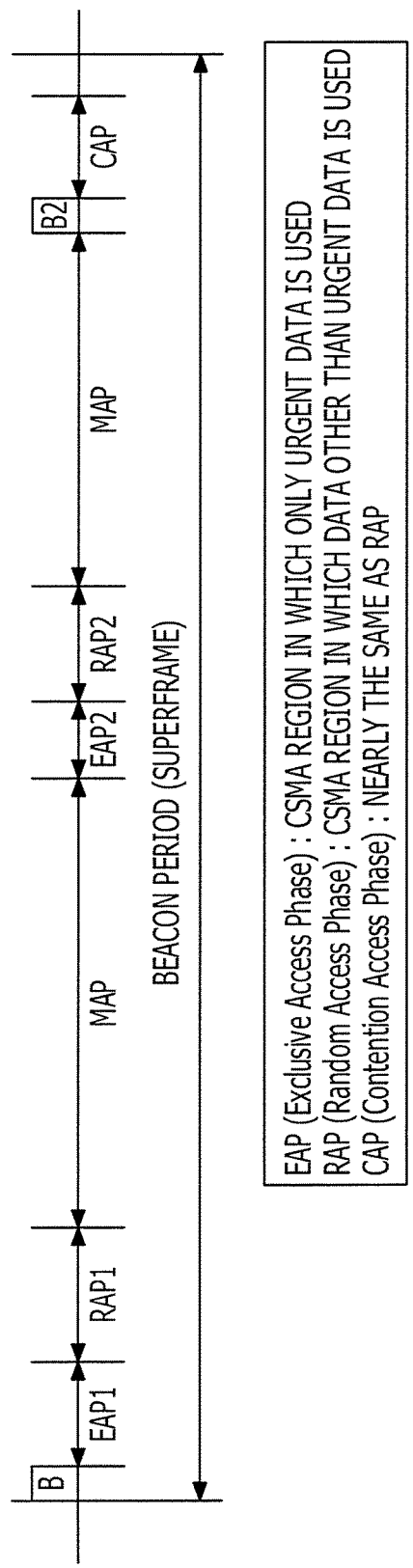
FIG. 2 is a diagram illustrating an example of a superframe for a beacon mode.

FIG. 2 illustrates a superframe for a beacon mode with beacon periods (superframes). In FIG. 2, the abscissa indicates time. The beacon mode is a mode in which both time period in which schedule-based communication is executed and time period in which the hub waits to receive unexpectedly generated urgent data from a node may be prepared.

The superframe for the beacon mode includes an exclusive access phase (EAP), a random access phase (RAP), an MAP, and a contention access phase (CAP). The EAP is a time period that may be used for urgent data and in which communication may be executed by carrier sense multiple access (CSMA). The RAP and the CAP are time periods that may be used for data other than urgent data and in which communication may be executed by CSMA. In the MAP, a node other than a node that executes scheduled communication may be in the sleep state and the hub may be in the sleep state for a time period in which the hub does not communicate with a node that executes scheduling, and whereby power to be consumed may be reduced. The EAP and the RAP are supported for the case where data to be unexpectedly communicated is generated in a node. In the beacon mode, however, the hub waits for transmission of a beacon and access from a node in the EAP and the RAP during a normal operation, and it is difficult to reduce power to be consumed.

Therefore, the embodiment disclosed herein, for example, provides techniques for reducing power to be consumed and receiving unexpectedly generated data.

(Radio Communication System)

Figure 3:
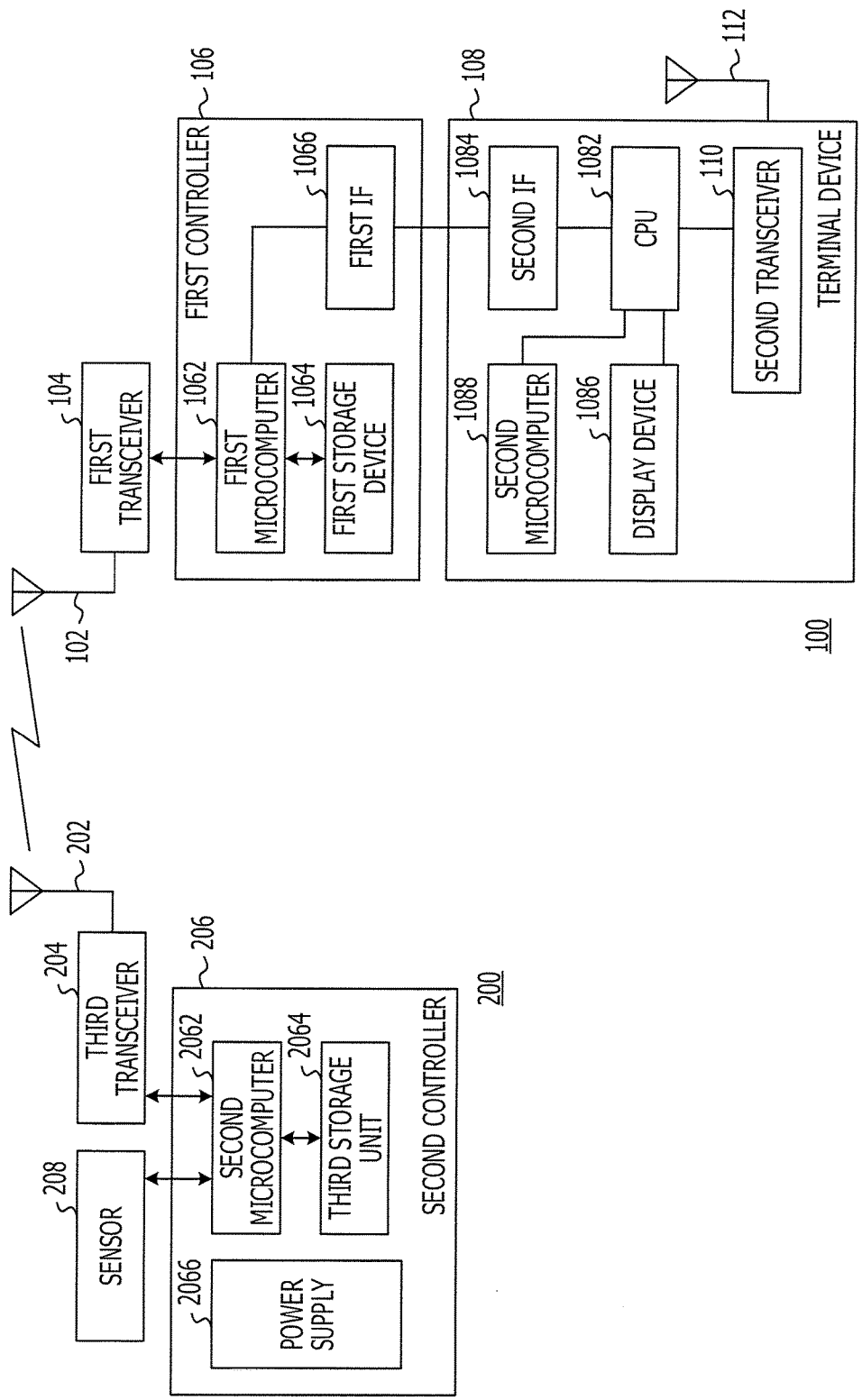
FIG. 3 is a diagram illustrating an example of a radio communication system according to the embodiment.

FIG. 3 illustrates an example of a radio communication system according to the embodiment.

The radio communication system includes a plurality of radio communication devices. Each of the radio communication devices includes a hub and a node. In this case, each of the hubs is set and thereby may communicate with one or more nodes. The hubs may be referred to as base units or coordinators. The nodes may be referred to as extensions. FIG. 3 mainly illustrates a hardware configuration of a hub 100 and a hardware configuration of a node 200.

The embodiment of the radio communication system describes the case where radio communication is executed between the hub 100 and the node 200. In the embodiment of the radio communication system, the hub 100 and the node 200 transmit and receive a radio signal in accordance with IEEE802.15.6. The hub 100 and the node 200 may transmit and receive a radio signal in accordance with a communication method other than IEEE802.15.6. For example, the hub 100 and the node 200 may transmit and receive a radio signal in accordance with IEEE802.15.4.

(Hub 100)

The hub 100 includes a first antenna 102, a first transceiver 104, a first controller 106, and a mobile terminal 108. The first antenna 102, the first transceiver 104, and the first controller 106 may be achieved by a module.

The first transceiver 104 transmits and receives a radio signal to and from the node 200. The first transceiver 104 may include a receiver for receiving a radio signal and a transmitter for transmitting a radio signal.

The first controller 106 is connected to the first transceiver 104. The first controller 106 causes data to be input to the mobile terminal 108 from the first transceiver 104. The first controller 106 includes a first microcomputer 1062, a first storage device 1064, and a first interface (IF) 1066.

The first microcomputer 1062 executes control in accordance with a program stored in the first storage device 1064.

The first IF 1066 is an interface with the mobile terminal 108.

The mobile terminal 108 transmits data received from the controller 106 to an external device (not illustrated). The external device includes a server. The mobile terminal 108 includes a CPU 1082, a second IF 1084, a display device 1086, a second storage device 1088, and a second transceiver 110.

The CPU 1082 executes control in accordance with a program stored in the second storage device 1088. For example, the CPU 1082 controls transmission of data received from the first controller 106 from the second transceiver 110 to the external device. The CPU 1082 may control storage of the data received from the first controller 106 in the second storage device 1088. The CPU 1082 may control display of the data received from the first controller 106 on the display device 1086.

The second IF 1084 is an interface with the first controller 106.

The display device 1086 may display the data received from the first controller 106. The display device 1086 may display information indicating whether or not the data is urgent while displaying the data received from the first controller 106.

The second storage device 1088 may store the data received from the first controller 106.

The second transceiver 110 transmits and receives a radio signal to and from the external device. The second transceiver 110 may include a receiver for receiving a radio signal and a transmitter for transmitting a radio signal.

(Node 200)

The node 200 includes a third antenna 202, a third transceiver 204, a second controller 206, and a sensor 208.

The third transceiver 204 transmits and receives a radio signal to and from the hub 100 through the third antenna 202. The third transceiver 204 may include a receiver for receiving a radio signal and a transmitter for transmitting a radio signal.

The second controller 206 is connected to the third transceiver 204. The second controller 206 includes a second microcomputer 2062, a third storage device 2064, and a power supply 2066.

The second microcomputer 2062 controls the node 200 in accordance with a program stored in the third storage device 2064.

The power supply 2066 supplies power to the second microcomputer 2062, the third storage device 2064, and the like.

The sensor 208 is connected to the second controller 206. The sensor 208 measures a target at which the node 100 is placed. In the example, the sensor 208 is placed on a human body. The sensor 208 includes an electrocardiograph, a pulse oximeter, a blood pressure monitor, a blood glucose meter, an electroencephalograph, or the like. The sensor 208 causes measured data to be input to the second controller 206. The measured data includes an electrocardiogram, a heart rate, a respiration rate, a pulse rate, a precutaneous arterial oxygen saturation (SpO2), blood pressure, a blood glucose value, an electroencephalogram, and the like.

In the embodiment of the radio communication system, the measured data that is detected by the sensor 208 is periodically transmitted to the hub 100 from the node 200. The measured data that is detected by the sensor 208 may be randomly transmitted to the hub 100 from the node 200. The hub 100 transmits the measured data received from the node 200 to the external device. Thus, the external device may periodically acquire the measured data on the human body.

The node 200 determines whether or not the measured data detected by the sensor 208 is normal. For example, the node 200 compares the measured data with a threshold and determines whether or not the measured data is normal. It is preferable that thresholds may be prepared for the measured data items. The thresholds may be prepared for time periods and different from each other. For example, the thresholds may be prepared for the morning, the daytime, and the night.

(Functions of Hub 100)

Figure 4:
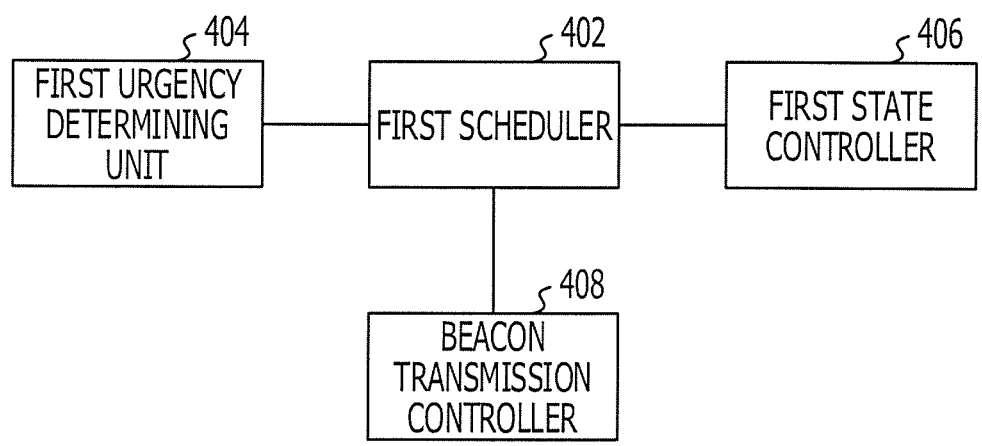
FIG. 4 is a diagram illustrating an example of a hub according to the embodiment.

FIG. 4 is a functional block diagram illustrating the hub 100.

The first microcomputer 1062 functions as a first urgency determining unit 404, a first scheduler 402, a first state controller 406, and a beacon transmission controller 408. For example, the first microcomputer 1062 functions in accordance with software stored in the first storage device 1064 and thereby functions as the first urgency determining unit 404, the first scheduler 402, the first state controller 406, and the beacon transmission controller 408. For example, the first microcomputer 1062 may function in accordance with firmware and thereby function as the first urgency determining unit 404, the first scheduler 402, the first state controller 406, and the beacon transmission controller 408.

The first scheduler 402 schedules communication with the node 200. For example, the first scheduler 402 schedules the communication in accordance with a superframe that includes a time period in which schedule-based communication is executed and a time period in which the hub 100 may wait to receive unexpectedly generated urgent data from the node 200.

Figure 5:
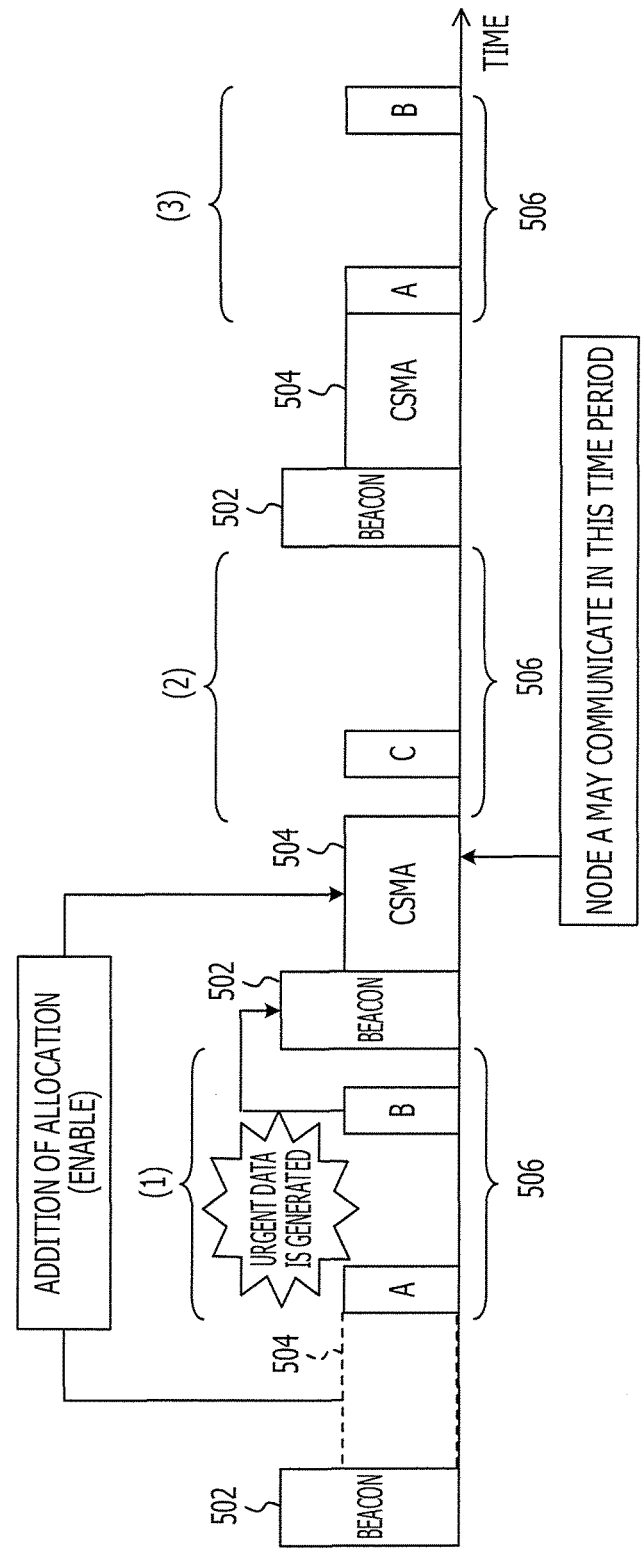
FIG. 5 is a diagram illustrating an example of a superframe according to the embodiment.

FIG. 5 illustrates an example of the superframe according to the embodiment. In FIG. 5, the abscissa indicates time.

The superframe illustrated in FIG. 5 includes time periods (hereinafter referred to as "beacon periods 502") in which a beacon is transmitted. In addition, the superframe includes a time period in which the hub 100 may communicate with a node that has accessed the hub 100 by a competitive access method and time periods (hereinafter referred to as "MAP periods 506") in which the hub 100 may communicate with a scheduled node. The competitive access method may be CSMA, ALOHA, slotted ALOHA, or the like. In the example of the superframe, CSMA is described. The same applies to the cases where ALOHA, slotted ALOHA, and the like are used. Time periods in which the hub 100 and a node that has accessed the hub 100 by CSMA may communicate with each other are referred to as "CSMA periods 504". The CSMA periods 504 are used for the case where the hub 100 receives urgent data from the node 200. Thus, a CSMA region is not normally set. Hereinafter, a communication mode in which a CSMA period 504 is not used is referred to as a "communication mode A", and a communication mode in which a CSMA period 504 is used is referred to as a "communication mode B".

In the example illustrated in FIG. 5, three MAP periods 506 (1) to (3) are illustrated. The MAP period 506 (1) includes two time periods (indicated by "A" and "B") in which the hub 100 may communicate with a scheduled node. The MAP period 506 (2) includes one time period (indicated by "C") in which the hub 100 may communicate with a scheduled node. MAP period 506 (3) includes two time periods (indicated by "A" and "B") in which the hub 100 may communicate with a scheduled node.

For example, it is assumed that the hub 100 may communicate with a node A in the time periods indicated by "A", communicate with a node B in the time periods indicated by "B", and communicate with a node C in the time period indicted by "C".

In the example of the superframe, in the beacon mode, when receiving urgent data from the node 200, the hub 100 uses CSMA periods such as EAPs and RAPs. In the example illustrated in FIG. 5, urgent data is generated in the node B within the MAP period 506 (1). The node B transmits the urgent data to the hub 100 within a time period allocated to the node B. When receiving the urgent data, the hub 100 enables the CSMA periods such as the EAPs and the RAPs to be used. Since the hub 100 enables the CSMA periods to be used, a node may communicate with the hub 100 in the CSMA periods. In the example illustrated in FIG. 5, the nodes A, B, and C may communicate with the hub 100 in the CSMA periods after the MAP period 506 (1).

The CSMA periods such as the EAPs and the RAPs are not used and communication is not executed until the hub 100 receives urgent data. Thus, the hub 100 may be in the sleep state for the CSMA periods 504 unless the hub 100 receives urgent data from the node 200. Thus, power to be consumed may be reduced. Since the CSMA periods such as the EAPs and RAPs may be used when a node detects urgent data, another node may transmit urgent data.

The first urgency determining unit 404 is connected to the first scheduler 402. The first urgency determining unit 404 determines whether or not data received from the node 200 is urgent. For example, the first urgency determining unit 404 references a frame type included in the data received from the node 200 and determines whether or not the data is urgent. If the first urgency determining unit 404 determines that the data received from the node 200 is urgent, the first urgency determining unit 404 notifies the first scheduler 402 that the hub 100 has received the urgent data. For example, if the data received from the node 200 includes information that indicates that an urgency level is highest, the first urgency determining unit 404 may determine that the data is urgent. When the first scheduler 402 receives, from the first urgency determining unit 404, the notification indicating that the hub 100 has received the urgent data, the first scheduler 402 enables the CSMA periods 504 included in the superframe to be used.

If the first urgency determining unit 404 determines that the data received from the node 200 is not urgent, the first urgency determining unit 404 determines whether or not the data is semi-urgent. For example, if the data received from the node 200 includes information indicating an abnormal state, the first urgency determining unit 404 may determine that the data is semi-urgent. If the urgency determining unit 404 determines that the data received from the node 200 is semi-urgent, the first urgency determining unit 404 notifies the first scheduler 402 that the hub 100 has received the semi-urgent data. If the first scheduler 402 receives, from the first urgency determining unit 404, the notification indicating that the hub 100 has received the semi-urgent data, the first scheduler 402 counts the number of times when the hub 100 receives semi-urgent data. If the first scheduler 402 confirms that the number of times when the hub 100 receives semi-urgent data is equal to or larger than a given threshold, the first scheduler 402 enables the CSMA periods 504 included in the superframe to be used. For example, if the first scheduler 402 confirms that the number of times when the hub 100 receives semi-urgent data within a given time period is equal to or larger than the given threshold, the first scheduler 402 may enable the CSMA periods 504 included in the superframe to be used. If the hub 100 does not receive semi-urgent data within a given time period after the hub 100 receives semi-urgent data, the first scheduler 402 may reset the number of times when the hub 100 receives semi-urgent data.

If the first urgency determining unit 404 determines that the data received from the node 200 is not urgent and semi-urgent, the first urgency determining unit 404 notifies the first scheduler 402 that the hub 100 has received the data. If the hub 100 receives data other than urgent data and semi-urgent data a given number of times after a change to the communication mode B, the first scheduler 402 changes the communication mode B to the communication mode A.

For example, if the first scheduler 402 confirms that the number of times when the hub 100 receives data other than urgent data and semi-urgent data within a given time period is equal to or larger than a given threshold, the first scheduler 402 changes the communication mode B to the communication mode A. If the hub 100 does not receive data other than urgent data and semi-urgent data after a given time elapses after the hub 100 receives the data other than urgent data and semi-urgent data, the first scheduler 402 may reset the number of times when the hub 100 receives the data.

The first scheduler 402 notifies the first state controller 406 whether the hub 100 executes communication in accordance with the communication mode A or B.

The first state controller 406 controls the hub 100 so as to cause the hub 100 to be in the sleep state based on the communication mode notified by the first scheduler 402. For example, if the first scheduler 402 notifies the first state controller 406 of the communication mode A, the first state controller 406 controls the hub 100 so as to cause the hub 100 to be in the sleep state for time periods, each of which is included in any of the CSMA periods 504 and the MAP periods 506 and is not scheduled to be allocated to the node 200. For example, if the first scheduler 402 notifies the first state controller 406 of the communication mode B, the first state controller 406 controls the hub 100 so as to cause the hub 100 to be for the sleep state for time periods, each of which is included in any of the MAP periods 506 and is not scheduled to be allocated to the node 200.

The beacon transmission controller 408 controls transmission of a beacon in accordance with scheduling by the first scheduler 402.

FIG. 6 is a diagram illustrating an example of a beacon frame according to the embodiment.

The beacon frame includes PLCP preamble, PLCP Header, MAC Header, MAC Frame Body, and FCS fields.

Figure 7:
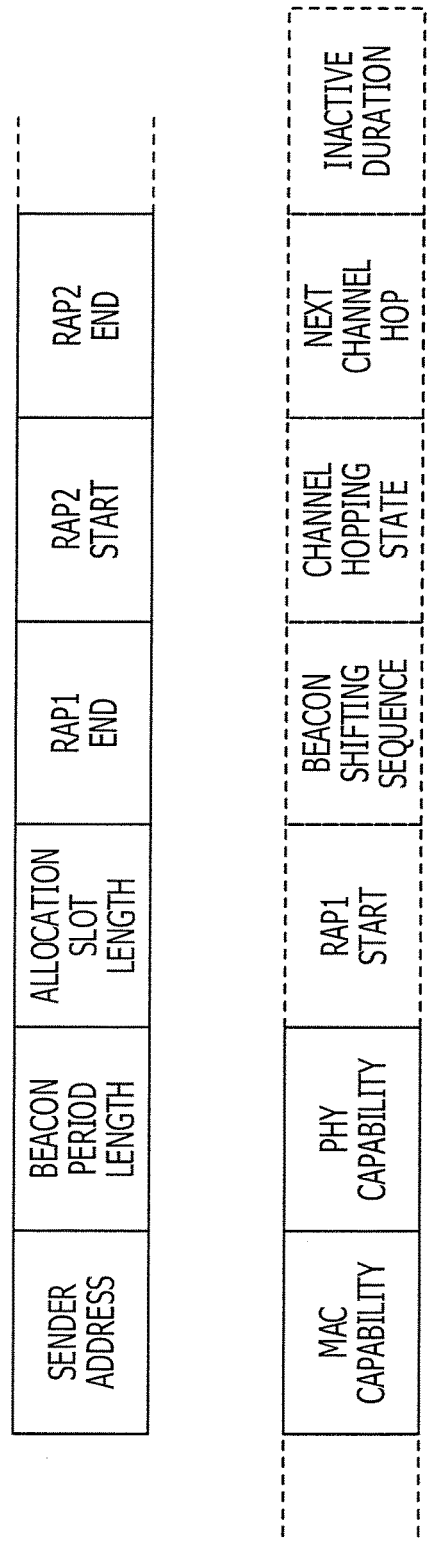
FIG. 7 is a diagram illustrating an example of the beacon frame according to the embodiment.

FIG. 7 illustrates an example of the MAC Frame Body field included in the beacon frame according to the embodiment.

The MAC Frame Body field includes Sender Address, Beacon Period Length, Allocation Slot Length, RAP1 End, RAP2 Start, RAP2 End, MAC Capability, PHY Capability, RAP1 Start, Beacon Shifting Sequence, Channel Hopping State, Next Channel Hop, and Inactive Duration fields.

When the hub 100 executes communication in the communication mode B in accordance with scheduling by the first scheduler 402, the beacon transmission controller 408 causes the beacon frame to include information specifying a CSMA period. For example, the beacon transmission controller 408 specifies the CSMA period by inserting given information in the RAP1 Start, RAP1 End, RAP2 Start, and RAP2 End fields.

When the hub 100 executes communication in the communication mode A, the beacon transmission controller 408 may set a beacon period to be short. When the hub 100 executes communication in the communication mode B, the beacon transmission controller 408 does not execute allocation in a time period scheduled for CSMA allocation. Since the beacon transmission controller 408 does not execute the allocation in the time period scheduled for CSMA allocation, the hub 100 may be in the sleep state for the time period in which the allocation is not executed, and whereby power to be consumed may be reduced.

(Functions of Node 200)

Figure 8:
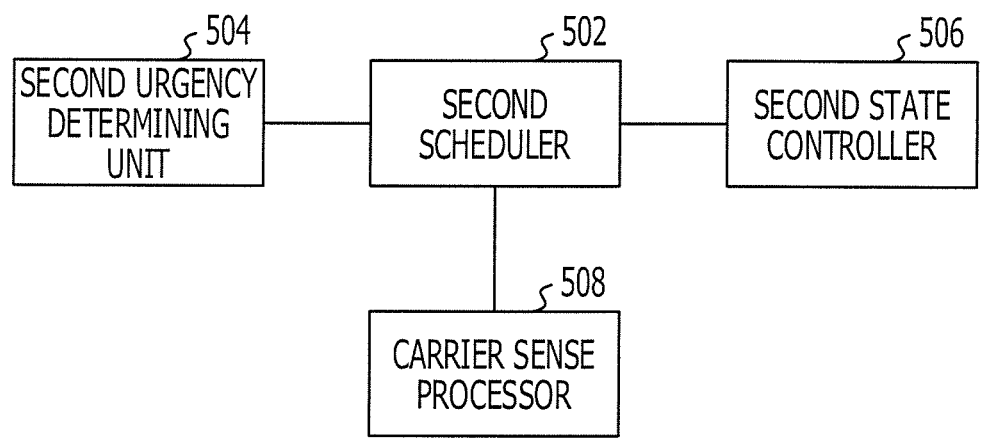
FIG. 8 is a diagram illustrating an example of a node according to the embodiment.

FIG. 8 is a functional block diagram illustrating the node 200.

The second microcomputer 2062 functions as a second urgency determining unit 504, a second scheduler 502, a second state controller 506, and a carrier sense processor 508. For example, the second microcomputer 2062 functions in accordance with software stored in the third storage device 2064 and thereby functions as the second urgency determining unit 504, the second scheduler 502, the second state controller 506, and the carrier sense processor 508.

The second scheduler 502 controls transmission to the hub 100 in accordance with scheduling by the hub 100. For example, the second scheduler 502 controls schedule-based communication and controls communication in CSMA periods.

Figure 9:
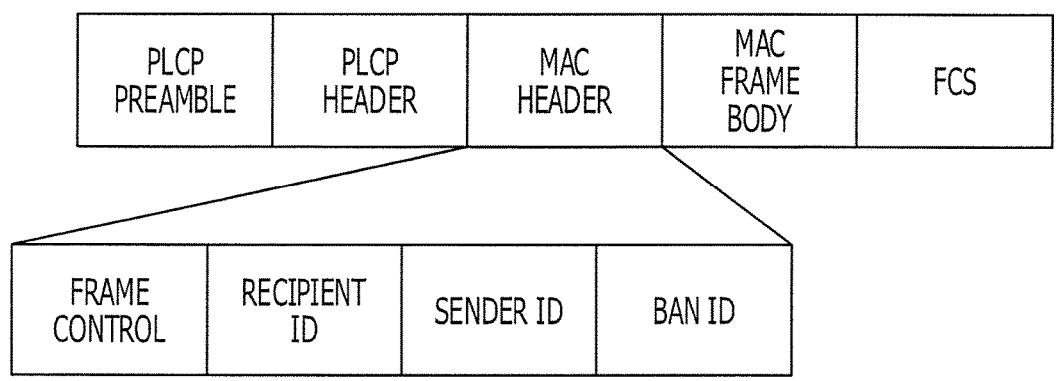
FIG. 9 is a diagram illustrating an example of data that is transmitted from the node according to the embodiment.

FIG. 9 illustrates an example of the format of a frame that is transmitted by the node 200.

The frame includes PLCP Preamble, PLCP Header, MAC Header, MAC Frame Body, and FCS fields.

The MAC header includes Frame Control, Recipient ID, Sender ID, and BAN ID fields.

Figure 10:
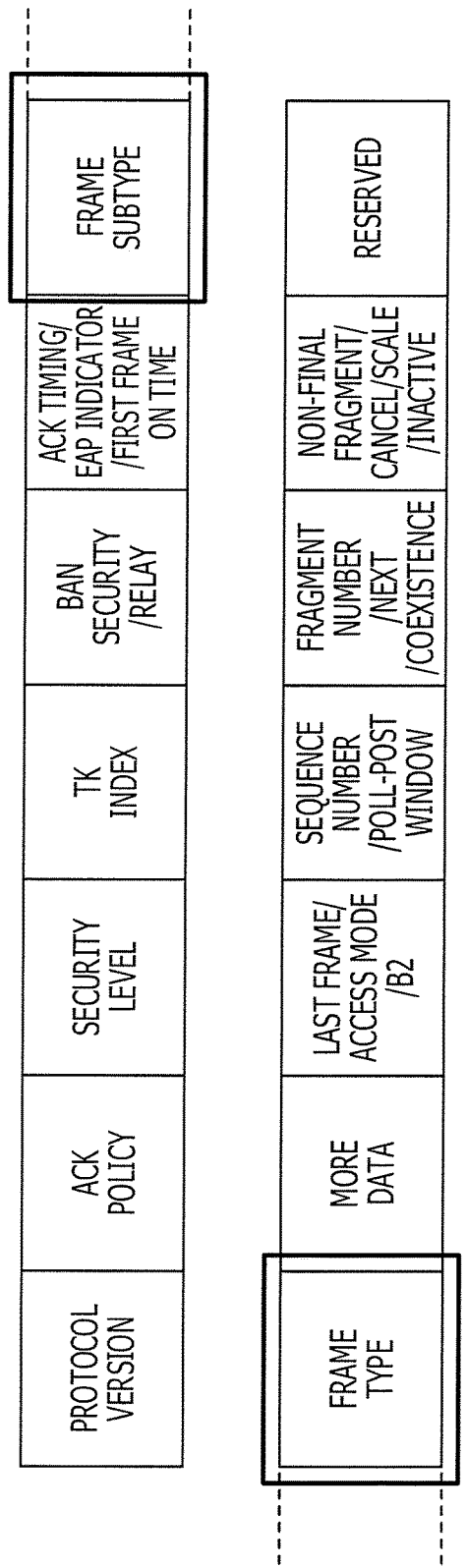
FIG. 10 is a diagram illustrating an example of the data that is transmitted from the node according to the embodiment.

FIG. 10 illustrates an example of the format of the Frame Control field. The Frame Control field includes Protocol Version, Ack Policy, Security Level, TK Index, and BAN Security/Relay fields. In addition, the Frame Control field includes Ack Timing/EAP Indicator/First Frame On Time, Frame Subtype, Frame Type, and More Data fields. In addition, the Frame Control field includes Last Frame/Access Mode/B2, Sequence Number/Poll-Post Window, and Fragment Number/Next/Coexistence fields. Furthermore, the Frame Control field includes Non-final Fragment/Cancel/Scale/Inactive, and Reserved fields.

FIG. 11 illustrates an example of values of the Frame Type and Frame Subtype fields.

Referring to FIG. 11, "10" is stored in a Frame Type value b5b4 field, and "0111" is stored in a Frame Subtype value b3b2b1b0 field, and whereby the Frame Control field may specify data that is urgent.

The second urgency determining unit 504 determines whether or not the measured data received from the sensor 208 is normal. For example, the second urgency determining unit 504 compares the measured data with a threshold and determines whether or not the measured data is normal. If the second urgency determining unit 504 determines that the measured data is abnormal, the second urgency determining unit 504 determines whether or not the measured data is urgent. For example, if a measurement item that is included in the measured data and related to human life is abnormal, the second urgency determining unit 504 may determine that the measured data is urgent. If the second urgency determining unit 504 determines that the measured data is urgent, the second urgency determining unit 504 causes the measured data including urgent information to be input to the second scheduler 502. If the measured data including the urgent information is input to the second scheduler 502 from the second urgency determining unit 504, the second scheduler 502 transmits, to the second state controller 506, a command to cause the node 200 to be restored from the sleep state. In addition, the second scheduler 502 transmits, to the carrier sense processor 508, a command to execute carrier sense.

The carrier sense processor 508 executes the carrier sense in accordance with the command (received from the second scheduler 502) to execute the carrier sense. For example, the carrier sense processor 508 receives a beacon signal from the hub 100 and searches a CSMA period.

The second scheduler 502 controls transmission of the measured data including the urgent information in the CSMA period searched by the carrier sense processor 508. In addition, the second scheduler 502 controls the transmission of the measured data including the urgent information at the time to transmit the measured data.

(Operations of Radio Communication System)

Figure 12:
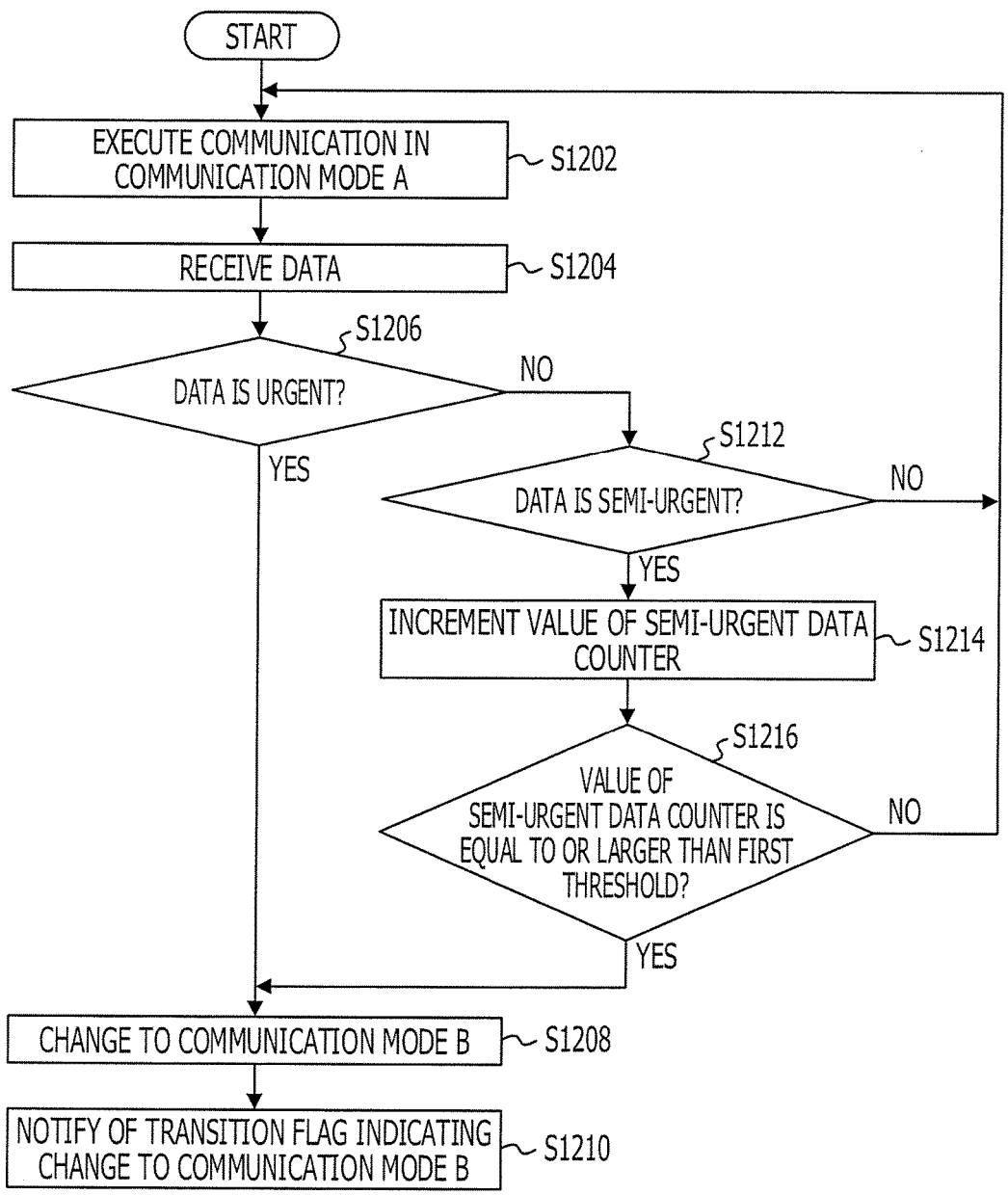
FIG. 12 is a flowchart of an example of operations of the hub according to the embodiment.

FIG. 12 illustrates an example of operations of the radio communication system. FIG. 12 mainly illustrates an example of operations of the hub 100.

In step S1202, the hub 100 executes communication in the communication mode A.

In step S1204, the hub 100 receives data from the node 200.

In step S1206, the hub 100 determines whether or not the data received from the node 200 is urgent.

If the hub 100 determines that the data received from the node 200 is urgent, the hub 100 changes to the communication mode B in step S1208.

In step S1210, the hub 100 notifies the node 200 of a transition flag indicating the change to the communication mode B after the change to the communication mode B. For example, the hub 100 transmits a beacon that includes information specifying a CSMA period.

If the hub 100 determines that the data received from the node 200 is not urgent in step S1206, the hub 100 determines whether or not the data is semi-urgent in step S1212. If the hub 100 determines that the data is not semi-urgent, a process illustrated in FIG. 12 returns to step S1202.

If the hub 100 determines that the data is semi-urgent in step S1212, the hub 100 increments a value of a semi-urgent data counter in step S1214.

In step S1216, the hub 100 determines whether or not the value of the semi-urgent data counter is equal to or larger than a first threshold. If the hub 100 determines that the value of the semi-urgent data counter is equal to or larger than the first threshold in step S1216, the process proceeds to step S1208. If the hub 100 determines that the value of the semi-urgent data counter is smaller than the first threshold in step S1216, the process returns to step S1202.

When the hub 100 receives data other than urgent data and semi-urgent data from the node 200 a given number of times after changing to the communication mode B, the hub 100 may change to the communication mode A.

In the embodiment of the radio communication system, the hub 100 and the node 200 communicate with each other in accordance with the beacon mode. When receiving data including urgent information from the node 200, the hub 100 allocates a CSMA period to the node 200. Thus, the hub 100 may be in the sleep state for the CSMA period until receiving the data including the urgent information from the node 200, and whereby power to be consumed may be reduced. When receiving the data including the urgent information from the node 200, the hub 100 may allocate the CSMA period to the node 200. Thus, when urgent data is generated in the node 200, the hub 100 may receive the urgent data.

Modified Example

In a modified example of the radio communication system, the hub 100 and the node 200 communicate with each other in accordance with the non-beacon mode. When urgent data is generated in the node 200 and received by the hub 100, the mode is changed to the beacon mode.

Figure 13:
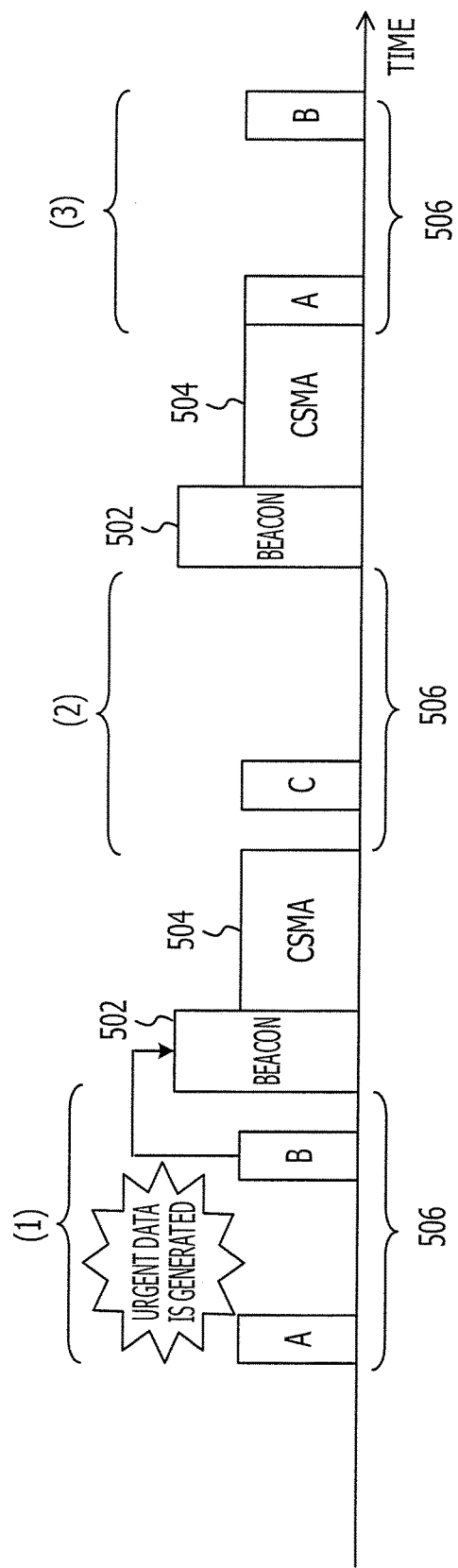
FIG. 13 is a diagram illustrating an example of the superframe according to the embodiment.

FIG. 13 illustrates an example of the superframe. In FIG. 13, the abscissa indicates time.

Before urgent data is generated in the node 200 and received by the hub 100, the hub 100 and the node 200 communicate with each other in accordance with the non-beacon mode in the superframe illustrated in FIG. 13. Thus, the superframe includes MAP periods.

In the example illustrated in FIG. 13, three MAP periods 506 (1) to (3) are illustrated. The MAP period 506 (1) includes two time periods (indicated by "A" and "B") in which the hub 100 may communicate with a scheduled node. The MAP period 506 (2) includes one time period (indicated by "C") in which the hub 100 may communicate with a scheduled node. The MAP period 506 (3) includes two time periods (indicated by "A" and "B") in which the hub 100 may communicate with a scheduled node.

For example, it is assumed that the hub 100 may communicate with the node A in the time periods indicated by "A", communicate with the node B in the time periods indicated by "B", and communicate with the node C in the time period indicated by "C".

The hub 100 that receives urgent data within a MAP period changes from the non-beacon mode to the beacon mode. In the example illustrated in FIG. 13, urgent data is generated in the node B within the MAP period 506 (1). The node B transmits the urgent data to the hub 100 within a time period allocated to the node B. When receiving the urgent data, the hub 100 changes to the beacon mode. Thus, the superframe after the hub 100 receives the urgent data includes beacon periods 502, CSMA periods 504, and the MAP periods 506.

(Hub 100)

An example of the hub 100 is substantially the same as the hub 100 illustrated in FIG. 3.

A functional block diagram illustrating the example of the hub 100 is substantially the same as FIG. 4.

The first scheduler 402 schedules communication with the node 200. For example, the first scheduler 402 executes the scheduling in accordance with the non-communication mode and switches to the beacon mode when receiving urgent data from the node 200.

The first urgency determining unit 404 is connected to the first scheduler 402. The first urgency determining unit 404 determines whether or not data received from the node 200 is urgent. For example, the first urgency determining unit 404 references a frame type included in the data received from the node 200 and determines whether or not the data is urgent. If the first urgency determining unit 404 determines that the data received from the node 200 is urgent, the first urgency determining unit 404 notifies the first scheduler 402 that the hub 100 has received the urgent data. For example, if the data received from the node 200 includes information indicating that an urgency level is highest, the first urgency determining unit 404 may determine that the data is urgent. When the first scheduler 402 receives, from the first urgency determining unit 404, the notification indicating that the hub 100 has received the urgent data, the first scheduler 402 switches from the non-beacon mode to the beacon mode.

The first urgency determining unit 404 may determine whether or not the data received from the node 200 is semi-urgent. For example, the first urgency determining unit 404 references the frame type included in the data received from the node 200 and determines whether or not the data is semi-urgent. If the first urgency determining unit 404 determines that the data received from the node 200 is semi-urgent, the first urgency determining unit 404 notifies the first scheduler 402 that the hub 100 has received the semi-urgent data. When receiving the notification indicating that the hub 100 has received the semi-urgent data, the first scheduler 402 may switch from the non-beacon mode to the beacon mode.

If the first urgency determining unit 404 determines that the data received from the node 200 is not urgent, the first urgency determining unit 404 notifies the first scheduler 402 that the hub 100 has received the data. When the hub 100 receives data other than urgent data and semi-urgent data a given number of times after a change to the communication mode B, the first urgency determining unit 404 may change the mode to the non-beacon mode.

For example, when the first scheduler 402 confirms that the number of times when the hub 100 receives data other than urgent data and semi-urgent data within a given time period is equal to or larger than a given threshold, the first scheduler 402 may change the mode to the non-beacon mode. If the hub 100 does not receive the data other than urgent data and semi-urgent data after a given time elapses after reception of the data other than urgent data and semi-urgent data by the hub 100, the first scheduler 402 may reset the number of times when the hub 100 receives the data.

The first scheduler 402 notifies the first state controller 406 whether the hub 100 executes communication in accordance with the non-beacon mode or the beacon mode.

The first state controller 406 causes the hub 100 to be in the sleep state based on the communication mode notified by the first scheduler 402. For example, if the first state controller 406 receives the notification indicating the non-beacon mode from the first scheduler 402, the first state controller 406 causes the hub 100 to be in the sleep state for a time period that is not scheduled to be allocated to the node 200. If the first state controller 406 receives the notification indicating the beacon mode from the first scheduler 402, the first state controller 406 causes the hub 100 to be in the sleep state for a time period that is included in a MAP period 506 and is not scheduled to be allocated to the node 200.

The beacon transmission controller 408 controls transmission of a beacon in accordance with scheduling by the first scheduler 402.

(Node 200)

An example of the node 200 is substantially the same as the node 200 illustrated in FIG. 3.

A functional block diagram of the example of the node 200 is substantially the same as FIG. 8.

The second scheduler 502 controls transmission to the hub 100 in accordance with scheduling by the hub 100. For example, the second scheduler 502 controls communication of the beacon mode and communication of the non-beacon mode.

The second urgency determining unit 504 determines whether or not the measured data received from the sensor 208 is normal. For example, the second urgency determining unit 504 compares the measured data with a threshold and determines whether or not the measured data is normal. If the second urgency determining unit 504 determines that the measured data is abnormal, the second urgency determining unit 504 determines whether or not the measured data is urgent. If the second urgency determining unit 504 determines that the measured data is urgent, the second urgency determining unit 504 notifies the second scheduler 502 of the measured data including urgent information. When receiving the measured data including the urgent information from the second urgency determining unit 504, the second scheduler 502 determines whether or not a time period from the current time to a time to transmit the measured data to the hub 100 is equal to or longer than a second threshold.

If the time period to the time to transmit the measured data to the hub 100 is equal to or longer than the second threshold, the second scheduler 502 transmits, to the second state controller 506, the command to cause the node 200 to be restored from the sleep state. In addition, the second scheduler 502 transmits, to the carrier sense processor 508, the command to execute the carrier sense.

The carrier sense processor 508 executes the carrier sense in accordance with the command (received from the second scheduler 502) to execute the carrier sense. For example, the carrier sense processor 508 receives a beacon signal from the hub 100 and searches a CSMA period.

If the time period to the time to transmit the measured data to the hub 100 is shorter than the second threshold, the second scheduler 502 controls transmission of the measured data including the urgent information at the time to transmit the measured data.

Figure 14:
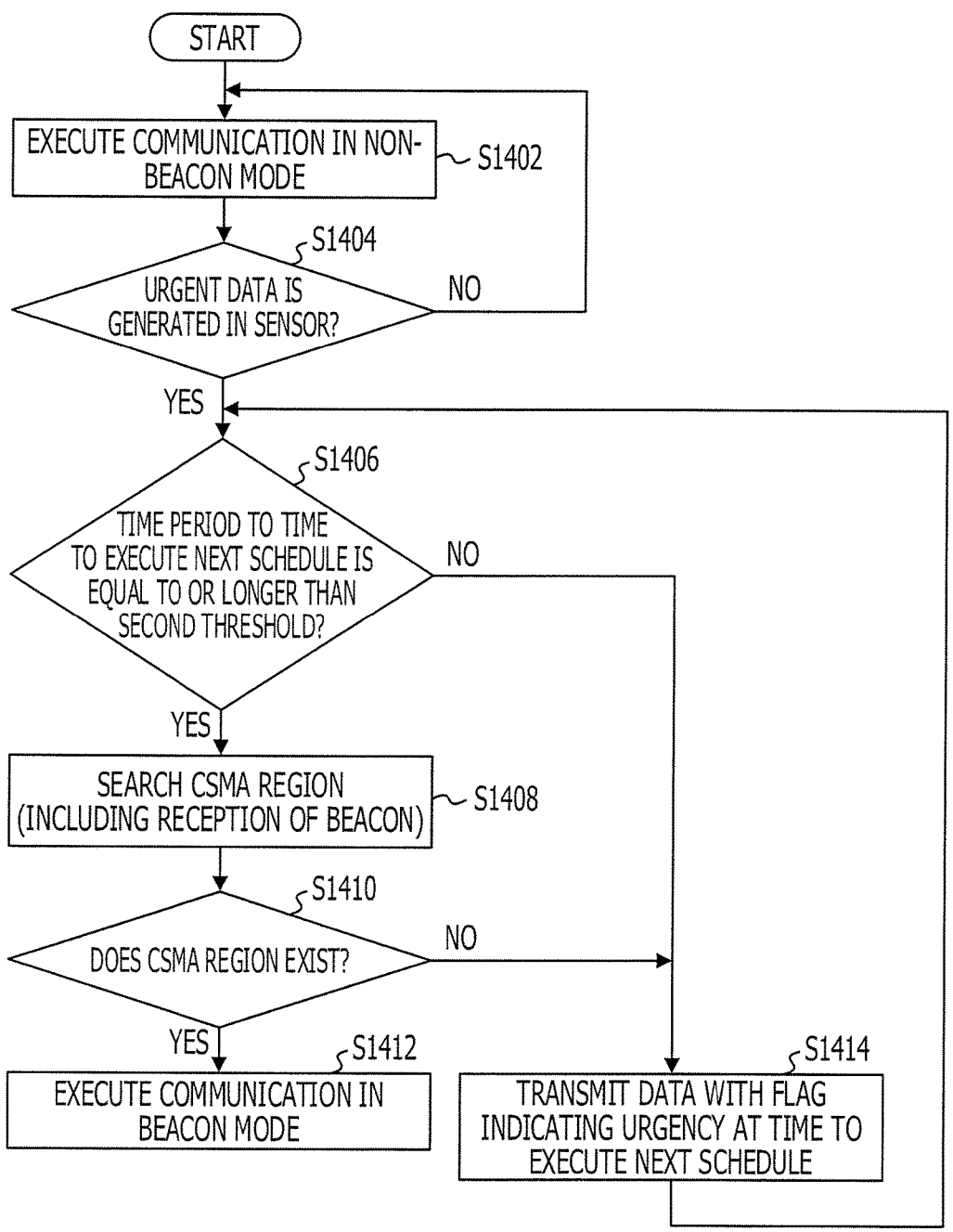
FIG. 14 is a flowchart of an example of operations of the node according to the embodiment.

FIG. 14 illustrates an example of operations of the radio communication system. FIG. 14 illustrates an example of operations of the node 200.

In step S1402, the node 200 executes communication in the non-beacon mode.

In step S1404, the node 200 determines whether or not urgent data is detected by the sensor 208.

If the node 200 determines that the urgent data is not detected by the sensor 208 in step S1404, a process illustrated in FIG. 14 returns to S1402.

If the node 200 determines that the urgent data is detected by the sensor 208 in step S1404, the node 200 determines whether or not a time period from the current time to a time to execute the next schedule is equal to or longer than the second threshold in step S1406.

If the node 200 determines that the time period to the time to execute the next schedule is equal to or longer than the second threshold in step S1406, the node 200 searches a CSMA period in step S1408. For example, the node 200 receives a beacon, acquires CSMA period information from the beacon, and searches the CSMA period.

In step S1410, the node 200 determines whether or not the CSMA period exists.

If the node 200 determines that the CSMA period exists in step S1410, the node 200 executes communication in the beacon mode in step S1412.

If the node 200 determines that the time period to the time to execute the next schedule is shorter than the second threshold in step S1406 or the node 200 determines that the CSMA does not exist in step S1410, the node 200 transmits data including a flag indicating urgency at the time to execute the next schedule in step S1414.

According to the embodiment of the radio communication system, when the node 200 receives urgent data in the beacon mode, an EAP and a RAP that are included in a superframe are used. When the node 200 does not receive urgent data, the node 200 may be in the sleep state for the EAP and the RAP. Thus, while power to be consumed may be reduced, unexpectedly generated communication data may be received.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A radio communication device comprising:
a receiver configured to receive a radio signal from a second radio communication device, the radio signal comprising data and indicating a level of urgency corresponding to the data; and
a processor coupled to the receiver, the processor configured to:
switch a communication mode associated with the radio communication device from a first communication mode to a second communication mode for a beacon period based on the level of urgency, wherein switching the communication mode comprises adding a competitive access period to the beacon period, wherein
time division multiplexing access is used in the first communication mode and wherein competitive access is used for communication between the radio communication device and the second radio communication device during the competitive access period in the second communication mode; and
the processor is further configured to:
control the communication to be performed using competitive access when the level of urgency indicated by information is greater than or equal to a first threshold, and
control the communication to be performed using competitive access when the level of urgency indicated by the information is greater than or equal to a second threshold, is less than the first threshold, and is received a given number of times or more.

2. The radio communication device according to claim 1, wherein the processor is further configured to:
schedule a first time period of the beacon period, wherein the communication is to be performed using the first communication mode during the first time period,
schedule a second time period of the beacon period as the competitive access period, wherein the communication is to be performed using the second communication mode during the second time period, and
enable, based on the level of urgency, the communication using competitive access in the second time period.

3. The radio communication device according to claim 1, wherein the processor is further configured to control a transmission of information indicating the second time period.

4. The radio communication device according to claim 1, wherein the processor is further configured to determine, based on the level of urgency, whether to control the communication to be performed using competitive access.

5. The radio communication device according to claim 1, wherein the processor is further configured to, when the level of urgency indicated by the information is less than the second threshold and received the given number of times or more, allocate a time slot in the beacon period to the second radio communication device.

6. A radio communication device comprising:
a transmitter configured to transmit, at a transmission time in a beacon period, a radio signal to a second radio communication device according to a communication mode associated with the radio communication device at the transmission time, wherein the radio signal includes data and a state corresponding to the radio communication device, the state indicating a level of urgency associated with the data; and
a processor coupled to the transmitter, configured to:
switch, during the beacon period, the communication mode from a first communication mode to a second communication mode based on the level of urgency, wherein switching the communication mode comprises adding a competitive access period to the beacon period,
wherein time division multiplexing access is used in the first communication mode and wherein competitive access is used for communication between the radio communication device and the second radio communication device during the competitive access period in the second transmission mode; and
the processor is further configured to:
control the communication to be performed using competitive access when the level of urgency indicated by information is greater than or equal to a first threshold, and
control the communication to be performed using competitive access when the level of urgency indicated by the information is greater than or equal to a second threshold, is less than the first threshold, and is transmitted a given number of times or more.

7. The radio communication device according to claim 6, wherein the processor is further configured to switch the communication mode from the first communication mode to the second communication mode for the communication when the level of urgency is urgent.

8. A method for controlling radio communication, the method comprising:
receiving, at a radio communication device, a radio signal from a second radio communication device, the radio signal comprising data and indicating a level of urgency corresponding to the data;
switching, by a processor, a communication mode associated with the radio communication device between a first communication mode and a second communication mode for a beacon period based on the level of urgency, wherein switching the communication mode comprises adding a competitive access period to the beacon period, wherein time division multiplexing access is used in the first communication mode and wherein competitive access is used for communication between the radio communication device and the second radio communication device during the competitive access period in the second communication mode;
controlling the communication to be performed using competitive access when the level of urgency indicated by information is greater than or equal to a first threshold; and
controlling the communication to be performed using competitive access when the level of urgency indicated by the information is greater than or equal to a second threshold, is less than the first threshold, and is received a given number of times or more.

9. The method according to claim 8, further comprising:
scheduling a first time period of the beacon period, wherein the communication is to be performed using the first communication mode during the first time period,
scheduling a second time period of the beacon period as the competitive access period, wherein the communication is to be performed using the second communication mode during the second time period, and
enabling, based on the level of urgency, the communication using competitive access in the second time period.

10. The method according to claim 8, further comprising:
controlling a transmission of information indicating the second time period.

11. The method according to claim 8, further comprising:
determining, based on the level of urgency, whether to control the communication to be performed using competitive access.

12. The method according to claim 8, further comprising:
allocating a time slot to the second radio communication device when the level of urgency is less than the second threshold and is received the given number of times or more.

13. A radio communication system, comprising:
a transmitting radio communication device including a first processor; and
a receiving radio communication device including a second processor,
wherein the second processor of the receiving radio communication device is configured to:
  receive a radio signal from the transmitting radio communication device, the radio signal comprising data and indicating a level of urgency corresponding to the data, and
  switch a communication mode associated with the radio communication device from a first communication mode to a second communication mode for a beacon period based on the level of urgency, wherein switching the communication mode comprises adding a competitive access period to the beacon period,
wherein time division multiplexing access is used in the first communication mode and wherein competitive access is used for communication between the receiving radio communication device and the transmitting radio communication device during the competitive access period in the second communication mode; and
the second processor is further configured to:
  control the communication to be performed using competitive access when the level of urgency indicated by information is greater than or equal to a first threshold, and
  control the communication to be performed using competitive access when the level of urgency indicated by the information is greater than or equal to a second threshold, is less than the first threshold, and is received a given number of times or more.

14. The radio communication system according to claim 13, wherein the transmitting radio communication device is configured to:
transmit, at a transmission time in the beacon period, the radio signal according to a communication mode associated with the transmitting radio communication device at the transmission time, wherein the radio signal includes the data and a state corresponding to the transmitting radio communication device, the state indicating the level of urgency associated with the data, and
switch, during the beacon period, the communication mode associated with the transmitting radio communication device from the first communication mode and the second communication mode based on the level of urgency.

* * * * *